US007028534B2

(12) United States Patent
Watanabe et al.

(10) Patent No.: US 7,028,534 B2
(45) Date of Patent: Apr. 18, 2006

(54) GAS-TIGHTNESS DIAGNOSING APPARATUS FOR A FUEL TANK WITH AN EVAPORATIVE EMISSION PURGE SYSTEM

(75) Inventors: Satoru Watanabe, Gunma (JP); Toru Mashimo, Gunma (JP)

(73) Assignee: Hitachi, Ltd., Tokyo-to (JP)

( * ) Notice: Subject to any disclaimer, the term of this patent is extended or adjusted under 35 U.S.C. 154(b) by 41 days.

(21) Appl. No.: 10/706,087

(22) Filed: Nov. 13, 2003

(65) Prior Publication Data

US 2004/0112119 A1 Jun. 17, 2004

(30) Foreign Application Priority Data

Dec. 13, 2002 (JP) ............................ 2002-362656

(51) Int. Cl.
*G01M 3/04* (2006.01)

(52) U.S. Cl. ...................................................... 73/49.7

(58) Field of Classification Search .................... 73/40, 73/40.5 R, 49.7, 118.1; 123/518, 519, 520; 702/51
See application file for complete search history.

(56) References Cited

U.S. PATENT DOCUMENTS 5,297,529 A * 3/1994 Cook et al. ................. 123/520
2002/0108604 A1 * 8/2002 Distelhoff et al. .......... 123/520

FOREIGN PATENT DOCUMENTS

JP 6-10777 A 1/1994

* cited by examiner

*Primary Examiner*—Charles Garber
(74) *Attorney, Agent, or Firm*—Sughrue Mion, PLLC

(57) ABSTRACT

In a gas-tightness diagnosing apparatus for a fuel tank with an evaporative emission purge system, the gas-tightness diagnosing apparatus includes a pressurizing device, such as an air pump, which is applied to the gas-tightness diagnosing operation. The air pump itself is mounted in the fuel tank. In this construction, the layout space for the air pump can be easily allocated by applying space of the fuel tank. The whole assembly of the apparatus can be also formed compact and easily mounted on vehicles.

10 Claims, 4 Drawing Sheets

GAS-TIGHTNESS DIAGNOSING APPARATUS FOR A FUEL TANK WITH AN EVAPORATIVE EMISSION PURGE SYSTEM

BACKGROUND OF THE INVENTION

The present invention relates generally to evaporative emission purge systems for fuel tanks, and more particularly to gas-tightness diagnosing apparatuses for evaporative emission purge systems.

A fuel tank with an evaporative emission purge system, which purges fuel vapors evaporated in the fuel tank into an intake portion of an engine, is well known as a fuel tank mounted to an automotive vehicle. One such evaporative emission purge system equipped fuel tank has been disclosed in Japanese Patent Provisional Publication No. 6-10777 (Otsuka) published Jan. 18, 1994 (hereinafter is referred to as "JP6-10777"). An evaporative emission purge system as disclosed in JP6-10777 includes a canister, a purge control valve and an air induction valve. The canister includes an adsorbent such as an activated carbon, which adsorbs fuel vapors. The canister is mounted at some midpoint in the purge line where fuel vapors pass from the fuel tank to the intake portion of the engine. The purge control valve, which is mounted at some midpoint in a purge line between the canister and the intake portion of the engine, opens or closes the purge line. The air induction valve inducts the air (or the atmospheric pressure) into the canister during purging fuel vapors. The purge control valve and the air induction valve are electrically connected to a control unit which controls engine operations. The control unit opens or closes the purge control valve and the air induction valve depending on engine operating conditions, to save or capture temporarily fuel vapors evaporated in the fuel tank in the canister, and to purge fuel vapors into the intake portion of the engine at suitable timings.

When the purge control valve and/or the air induction valve have some failures, or the purge line is damaged, fuel vapors possibly escape into the atmosphere even in the state where the control unit stops purging the fuel vapors. In the purge system of JP6-10777, a gas-tightness diagnosing apparatus including an air pump and a pressure sensor is mounted at a purge line of fuel vapors to diagnose the gas-tightness of the purge line in order to prevent the fuel vapors leakage. In this construction, the air pump is, for example, connected at some midpoint in the purge line between the canister and the purge control valve. First in diagnosing the gas-tightness, the purge control valve and the air induction valve are closed to enclose the portion of the purge line between the fuel tank and the purge control valve. The air pump is operated in this state to send air into and to raise pressure in the enclosed line. The control unit then senses a change in the pressure in the purge line with the pressure sensor. When the pressure falls largely in a short time, the control unit determines there are some failures of escape in the purge line.

SUMMARY OF THE INVENTION

In the diagnosing apparatus as disclosed in JP6-10777, the air pump is mounted at some midpoint in the purge line to diagnose the gas-tightness of the purge line. When an evaporative emission purge system and a gas-tightness diagnosing apparatus are mounted on an automotive vehicle, not only parts such as a canister, a purge control valve, an air induction valve and a purge line, constructing the evaporative emission purge system, but also parts such as an air pump and pipes connected to the air pump are necessary to be mounted. When these parts for the gas-tightness diagnosing apparatus are installed on the vehicle, it is necessary to avoid interferences with other mounted parts in the limited space of the vehicle.

Consequently, there are difficulties in efficiently designing a vehicle due to allocating layout space for parts such as an evaporative emission purge system and an air pump between other mounted parts and to designing layout for parts such as pipes connected to the air pump in the remaining space. There are also difficulties in efficiently utilizing space of the vehicle due to many restrictions of layout of other mounted parts, which difficulties caused by placing these parts.

Accordingly, it is an object of the present invention to provide a gas-tightness diagnosing apparatus which avoids the aforementioned disadvantages. In other words, it is an object of the present invention to provide a gas-tightness diagnosing apparatus for a fuel tank with an evaporative emission purge system, with which apparatus layout space for parts relating to means for pressurizing can be easily allocated, the layout can be efficiently designed and space outside a fuel tank can be efficiently utilized.

In order to accomplish the aforementioned and other objects of the present invention, a gas-tightness diagnosing apparatus comprises a fuel tank, an evaporative emission purge system having a canister, for temporarily adsorbing fuel vapors created in the fuel tank by the canister and for purging the fuel vapors from the canister to an air intake portion of an internal combustion engine under a predetermined engine operating condition, a pressurizing device that raises an internal pressure in the fuel tank and in the evaporative emission purge system, a pressure sensor that detects the internal pressure, a diagnosing device that diagnoses a gas-tightness of the fuel tank and of the evaporative emission purge system based on a change in the internal pressure, and the pressurizing device being mounted in the fuel tank.

According to another aspect of the invention, a gas-tightness diagnosing apparatus comprises a fuel tank, evaporative emission purge means for capturing fuel vapors created in the fuel tank, for temporarily storing the fuel vapors and for purging the fuel vapors to an air intake portion of an internal combustion engine under a predetermined engine operating condition, pressurizing means for raising an internal pressure in the fuel tank and in the evaporative emission purge means, pressure sensing means for detecting the internal pressure, diagnostic means for diagnosing a gas-tightness of the fuel tank and of the evaporative emission purge means based on a change in the internal pressure, and pressurizing means being mounted in the fuel tank.

According to a further aspect of the invention, a gas-tightness diagnosing apparatus comprises a sealed fuel tank that stores therein volatile fuel, an evaporative emission purge system having a canister, for temporarily adsorbing fuel vapors created in the sealed fuel tank by the canister and for purging the fuel vapors from the canister to an air intake portion of an internal combustion engine under a predetermined engine operating condition, a pressurizing device that raises an internal pressure in the sealed fuel tank and in the evaporative emission purge system under a condition that the evaporative emission purge system is cut off from the air intake portion, a pressure sensor that detects the internal pressure, a diagnosing device that diagnoses a gas-tightness of the sealed fuel tank and of the evaporative emission purge system based on a change in the internal pressure, and the pressurizing device being mounted in the sealed fuel tank.

According to a still further aspect of the invention, a gas-tightness diagnosing apparatus comprises a sealed fuel tank that stores therein volatile fuel, evaporative emission purge system having a canister, for temporarily adsorbing fuel vapors created in the sealed fuel tank by the canister and for purging the fuel vapors from the canister to an air intake portion of an internal combustion engine under a predetermined engine operating condition, pressurizing means for raising an internal pressure in the sealed fuel tank and in the evaporative emission purge system under a condition that the evaporative emission purge system is cut off from the air intake portion, pressure sensing means for detecting the internal pressure, diagnostic means for diagnosing a gas-tightness of the sealed fuel tank and of the evaporative emission purge system based on a change in the internal pressure, and the pressurizing means being mounted in the sealed fuel tank.

According to another aspect of the invention, a method of diagnosing a gas-tightness of a sealed fuel tank with an evaporative emission purge system including at least a canister, a fuel-tank vapor vent line interconnecting the canister and the sealed fuel tank, a purge line interconnecting the canister and an air intake portion of an internal combustion engine, a purge control valve disposed in the purge line, and an air induction valve, for temporarily adsorbing fuel vapors created in the sealed fuel tank by the canister and for purging the fuel vapors from the canister to the air intake portion under a predetermined engine operating condition, the method comprises providing a pressurizing device in the sealed fuel tank, determining whether the engine is operative or inoperative, pressurizing a predetermined gas-tightness diagnosing space, which is defined by internal spaces of the sealed fuel tank, the fuel-tank vapor vent line, the canister, and the purge line, by operating the pressurizing device provided in the sealed fuel tank, when the engine is inoperative, detecting an internal pressure in the predetermined gas-tightness diagnosing space, determining whether the internal pressure is lower than a predetermined threshold value when a predetermined time period has expired from a starting point of the pressurizing device, and diagnosing that the gas-tightness of the predetermined gas-tightness space is degraded when the internal pressure is lower than the predetermined threshold value for the predetermined time period.

According to another aspect of the invention, a method of diagnosing a gas-tightness of a sealed fuel tank with an evaporative emission purge system including at least a canister, a fuel-tank vapor vent line interconnecting the canister and the sealed fuel tank, a purge line interconnecting the canister and an air intake portion of an internal combustion engine, a purge control valve disposed in the purge line, and an air induction valve, for temporarily adsorbing fuel vapors created in the sealed fuel tank by the canister and for purging the fuel vapors from the canister to the air intake portion under a predetermined engine operating condition, the method comprises providing a pressurizing device in the sealed fuel tank, determining whether the engine is operative or inoperative, fully closing both of the purge control valve and the air induction valve when the engine is inoperative, to define a predetermined gas-tightness diagnosing space defined by internal spaces of the sealed fuel tank, the fuel-tank vapor vent line, the canister, and the purge line, cut off from an exterior space with the purge control valve and the air induction valve both fully closed, pressurizing the determined gas-tightness diagnosing space by operating the pressurizing device provided in the sealed fuel tank, under a condition that the evaporative emission purge system is cut off from the air intake portion, detecting an internal pressure in the predetermined gas-tightness diagnosing space, determining whether the internal pressure falls lower than a predetermined threshold value when a predetermined time period has expired from a starting point of the pressurizing device, and diagnosing that the gas-tightness of the predetermined gas-tightness space is degraded when the internal pressure falls lower than the predetermined threshold value for the predetermined time period.

The above objects and other objects, features, and advantages of the present invention are readily apparent from the following detailed description of the best modes for carrying out the invention when taken in connection with the accompanying drawings.

DETAILED DESCRIPTION OF THE INVENTION

The gas-tightness diagnosing apparatus of the embodiment is exemplified in a sealed fuel tank with an evaporative emission purge system applied to an automotive vehicle.

Figure 1:
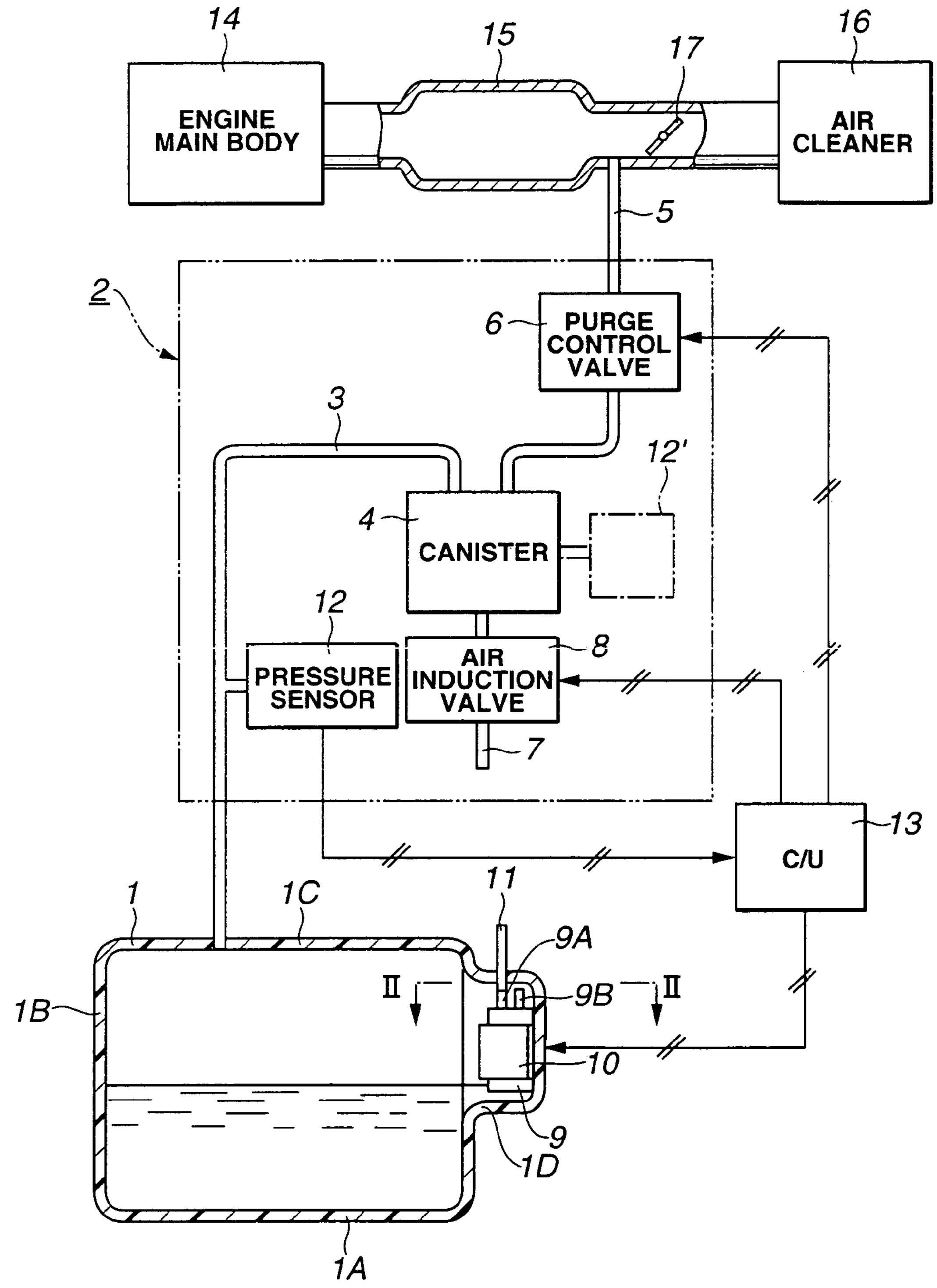
FIG. 1 is a general block diagram depicting an embodiment of a gas-tightness diagnosing apparatus for a fuel tank with an evaporative emission purge system.

Referring now to the drawings, particularly to FIG. 1, a fuel tank 1 is mounted on an automotive vehicle. In the shown embodiment, the sealed fuel tank is made of resin by injection molding. Fuel tank 1 is hermetically enclosed to the outside to save, capture or trap fuel vapors such as gasoline inside. Fuel tank 1 is comprised of a bottom panel 1A, a side wall 1B surrounding perpendicularly bottom panel 1A, and an upper panel 1C coupled to an upper portion of side wall 1B. Side wall 1B is formed with a blistered portion 1D, which is blistered toward the outside of fuel tank 1. Blistered portion 1D is preferably, placed filling the remaining space (dead space) between other mounted parts (not shown) placed around fuel tank 1 in order to be effectively applied as a part of the volume of fuel tank 1.

An evaporative emission purge system 2 is mounted on the vehicle together with fuel tank 1. Evaporative emission purge system 2 is comprised of pipes 3, 5 and 7, a canister 4, a purge control valve 6 and an air induction valve 8 (which parts will be described later). Evaporative emission purge system 2 is connected to fuel tank 1 and an intake pipe (an intake manifold) 15 (described later) of an engine main body 14 (described later). Full fluid communication between fuel tank 1 and intake pipe 15 is established when the engine operates in a predetermined condition such as middle throttle opening (described later). Under this condition (full fluid-communication state), evaporative emission purge system 2 purges fuel vapors through the canister to intake pipe 15.

Tank-side pipe 3 (fuel-tank vapor vent line) is connected to fuel tank 1. Tank-side pipe 3 is connected at one end to an interior space of fuel tank 1 and also connected at the other end to canister 4.

In the shown embodiment, canister 4 includes an adsorbent such as an activated carbon (not shown), and a gastight enclosure. Activated carbon of canister 4 adsorbs fuel vapors which flow from fuel tank 1 through tank-side pipe 3 into canister 4, so as to temporarily capture or trap the fuel vapors.

Engine-side pipe 5 (purge line) is connected to canister 4 at one end and to intake pipe 15 at the other end. Fuel vapors flow through engine-side pipe 5 into intake pipe 15.

Purge control valve 6, which is comprised of an electromagnetic solenoid valve (not shown), is placed at some midpoint in engine-side pipe 5. Purge control valve 6 is connected to canister 4 at an inflow port and to intake pipe 15 at an outflow port. Purge control valve 6 is opened or closed by a control unit 13 (described later) to open or close engine-side pipe 5. With purge control valve 6 opened, negative pressure (intake manifold vacuum) created in intake pipe 15 during operation of the engine is supplied to canister 4 through engine-side pipe 5 and purge control valve 6. Fuel vapors in fuel tank 1 is vacuumed into intake pipe 15 through canister 4.

An air induction pipe 7 is open to the atmosphere at one end and connected to canister 4 at the other end. Air induction pipe 7 inducts the air (or the atmosphere pressure) into canister 4.

Air induction valve 8, which is comprised of an electromagnetic solenoid valve (not shown), is placed at some midpoint in air induction pipe 7. Air induction valve 8 is opened or closed by control unit 13 to open or close air induction pipe 7 accordingly. When purge control valve 6 is opened and thus the intake manifold pressure from the engine is fed to canister 4, air induction valve 8 is simultaneously opened, so that the air is inducted into canister 4 through air induction pipe 7 and air induction valve 8. Conversely when purge control valve 6 and air induction valve 8 are both closed, the space including fuel tank 1, tank-side pipe 3, canister 4 and engine-side pipe 5, is enclosed or cut off or shut off in a gas-tight fashion from the exterior space. The aforementioned space corresponding to a predetermined gas-tightness diagnosing space, which is defined by internal spaces of sealed fuel tank 1, tank-side pipe 3, canister 4 and engine-side pipe 5, cut off from the exterior space with purge control valve 6 and air induction valve 8 both closed. Therefore, this space will be hereinafter referred to as a "predetermined gas-tightness diagnosing space." An operation of diagnosing the gas-tightness (described later) means that making a diagnosis on the gas-tightness (leakage) of the predetermined gas-tightness diagnosing space.

Figure 2:
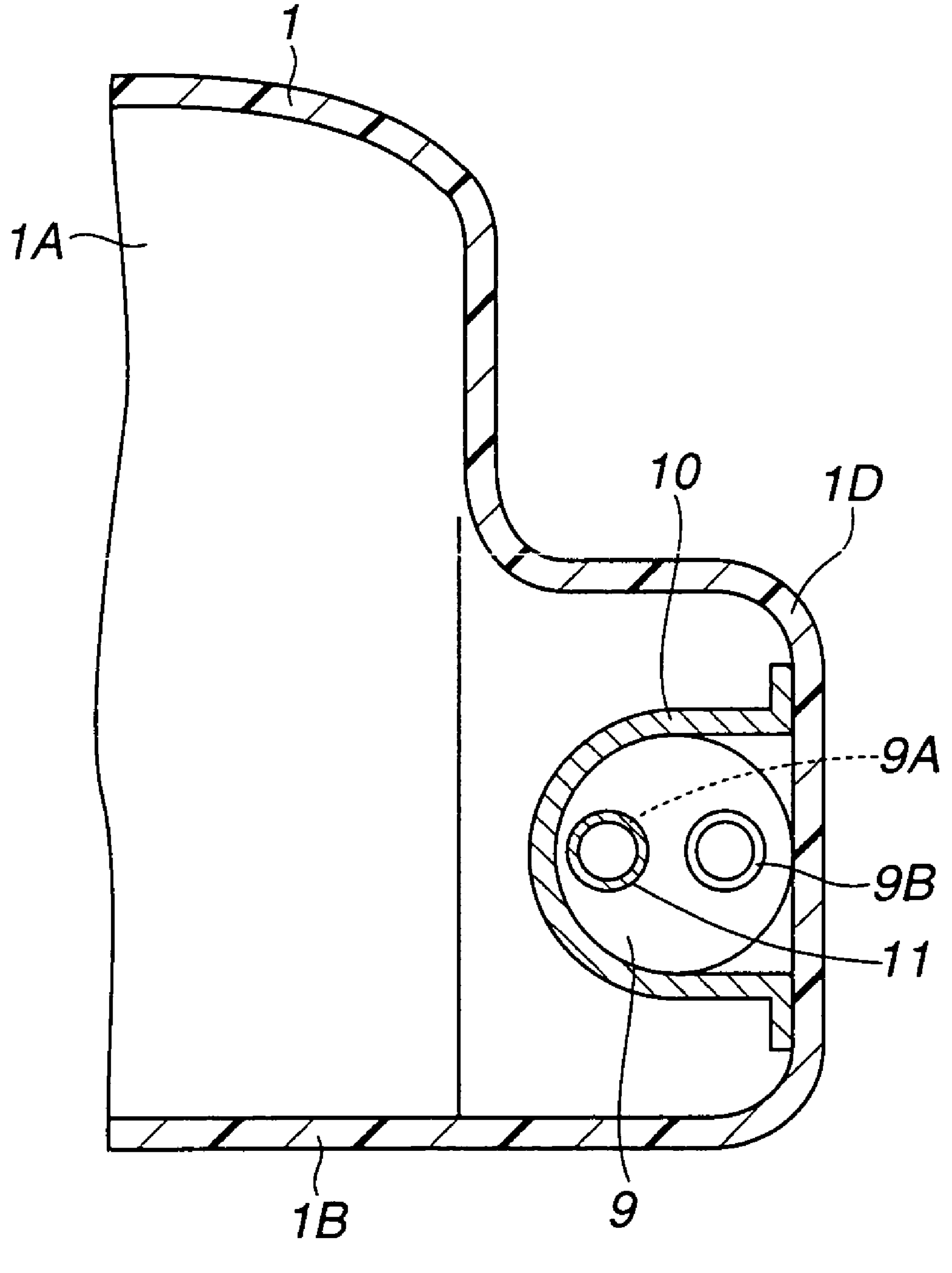
FIG. 2 is a partly enlarged cross-sectional view taken along the line II—II in FIG. 1 depicting the fuel tank.

As shown in FIGS. 1 and 2, an air pump 9, for example, comprises a diaphragm-type pump, a reciprocating-type pump such as a piston-type pump, or a rotary-type pump such as a trochoid-type pump or a vane-type pump. Air pump 9 is applied as means for pressurizing during the operation of diagnosing the gas-tightness. Air pump 9 is mounted or provided in blistered portion 1D of fuel tank 1 and fixed with a bracket 10 to the inside of blistered portion 1D. Air inlet 9A of air pump 9 is open to the outside of fuel tank 1 through an inlet pipe 11. An air outlet 9B of air pump 9 is directly open to fuel tank 1. Inlet pipe 11 is open to the outside of fuel tank 1 near upper panel 1C, and designed as the smallest size necessary for inducting the air outside the fuel tank 1 into the interior space of fuel tank 1. Air pump 9 is driven in response to a drive signal (a control command) from control unit 13 during the gas-tightness diagnosing operation, to vacuum the air outside the fuel tank 1 through air inlet 9A, to flow out the air to fuel tank 1 through air outlet 9B and accordingly to raise the pressure inside the fuel tank 1 and others, that is, the internal pressure in the previously discussed predetermined gas-tightness diagnosing space.

A pressure sensor 12 senses or detects pressure of the predetermined gas-tightness diagnosing space for the gas-tightness diagnosing operation. Pressure sensor 12 senses pressure of the predetermined gas-tightness diagnosing space enclosed during purge control valve 6 and air induction valve 8 being closed, the space including fuel tank 1, tank-side pipe 3, canister 4 and engine-side pipe 5. Pressure sensor 12 is mounted in tank-side pipe 3 in this embodiment. Pressure sensor 12 outputs signals to control unit 13.

Control unit 13, which is mounted on the vehicle as a means for diagnosing, is connected to purge control valve 6, air induction valve 8, air pump 9 and pressure sensor 12. Control unit 13, which generally comprises a micro computer with memory circuits such as ROM and RAM, controls engine operations with various sensors and actuators (not shown). Control unit 13 controls evaporative emission (adsorbing and purging) by opening or closing purge control valve 6 and air induction valve 8. When the engine operates in a particular condition (for example, a throttle valve 17 (described later) is in a substantially half-throttle state between fully open and fully closed), the evaporation purge control opens purge control valve 6 and air induction valve 8 to flow fuel vapors stored in fuel tank 1 and/or in canister 4 into intake pipe 15. When the engine operates out of the above condition (that is, throttle valve 17 is fully open or fully closed), the evaporation purge control closes purge control valve 6 and air induction valve 8, to save fuel vapors created in fuel tank 1, in canister 4. Control unit 13 also operates diagnosing the gas-tightness by using air pump 9 and pressure sensor 12. In diagnosing gas-tightness for the predetermined gas-tightness diagnosing space, first, purge control valve 6 and air induction valve 8 are both closed to cut off evaporative emission purge system 2 from intake pipe 15 of the engine. Second, the pressure in fuel tank 1 is risen by means of air pump 9, and then this pressure is sensed by pressure sensor 12 to diagnose the gas-tightness of the predetermined gas-tightness diagnosing space by using sensed value. Accordingly, control unit 13 operates diagnosing failures of fuel tank 1, tank-side pipe 3, canister 4, engine-side pipe 5, purge control valve 6 and air induction valve 8.

Engine main body 14 is mounted on the vehicle as a main part of a internal combustion engine. Intake pipe 15 is connected to cylinders (not shown) of engine main body 14 at one end. Intake pipe 15 inducts the outside air as an intake air to the cylinders. An air cleaner 16, which cleans the intake air, is connected to the other end of intake pipe 15. Throttle valve 17, which controls a quantity of intake air, is mounted at some midpoint in intake pipe 15.

With the previously discussed arrangement, the gas-tightness diagnosing apparatus of the embodiment operates as follows.

Fuel tank 1 provides fuel to engine main body 14, when the vehicle is in operation. Fuel is injected into the intake air by the injection valves (not shown) of the cylinders, and is burned in the cylinders. When a driver of the vehicle keeps throttle valve 17 halfway-open, purge control valve 6 and air induction valve 8 are opened and fuel vapors from fuel tank 1 escape into intake pipe 15 through the evaporative emission purge system 2. Fuel vapors are influenced by the intake negative pressure in intake pipe 15 nearer engine main body 14 than throttle valve 17, so that the gas flows into the cylinders not escaping outside and is burned with the intake air.

Figure 3:
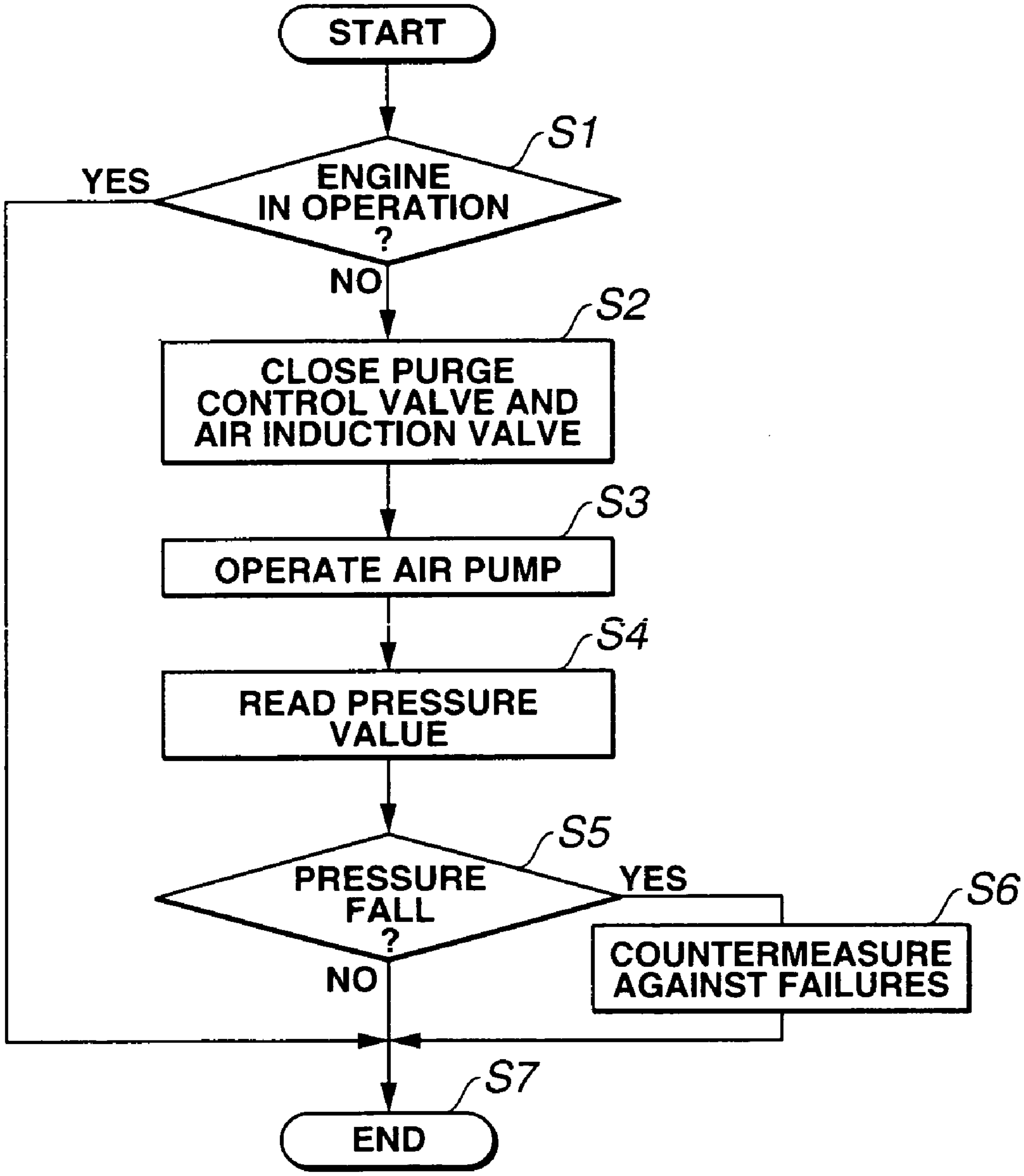
FIG. 3 is a flow chart depicting a gas-tightness diagnosing operation executed by a control unit.

Referring now to FIG. 3, there are shown an operation of diagnosing the gas-tightness by control unit 13.

First, at step S1, whether the engine is in operation or not, is determined. When "YES" is determined through step S1, intermediate steps of diagnosing the gas-tightness are canceled and the operation of diagnosing the gas-tightness terminates through step S7 (described later). When "NO" is determined through step S1, purge control valve 6 and air induction valve 8 are both closed to cut off evaporative emission purge system 2 from intake pipe 15, in order to operate diagnosing the gas-tightness, at step S2.

Figures 4A, 4B, 4C, 4D:
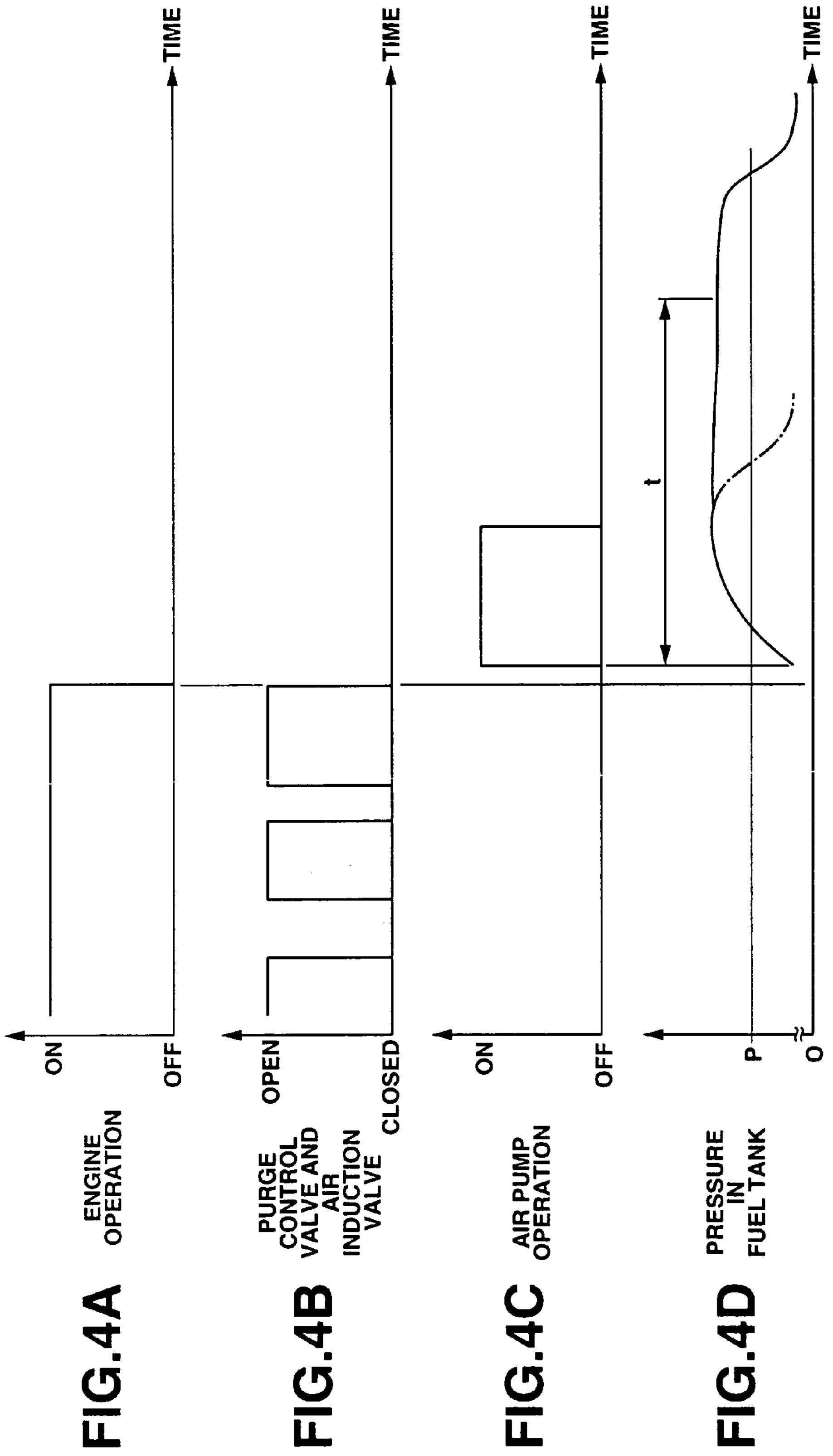
FIG. 4A is a time chart depicting operative and inoperative states of an internal combustion engine.
FIG. 4B is a time chart depicting open/closed states of both a purge control valve and an air induction valve.
FIG. 4C is a time chart depicting ON/OFF states of an air pump.
FIG. 4D is a time chart depicting variations in internal pressure in the fuel tank.

At step S3, air pump 9 is operated for a predetermined time interval to send the air outside fuel tank 1 into fuel tank 1. Pressure in fuel tank 1 which is enclosed, rises higher than a particular threshold value P, as shown in FIG. 4D.

At step S4, control unit 13 read the pressure value in fuel tank 1 which is sensed with pressure sensor 12.

At step S5, whether the sensed value of pressure falls lower than threshold value P during a predetermined time period t from starting time of air pump 9, is determined. If "YES" is determined through step S5, it means that the pressure in fuel tank 1 falls in a short time as the phantom line shown in FIG. 4D. Accordingly, control unit 13 diagnoses that there is a gas-tightness failure caused by some failures or damages in fuel tank 1, tank-side pipe 3, canister 4, engine-side pipe 5, the purge valve 6 or air induction valve 8. In this case, a particular countermeasure against failures is taken at step S6. For instance, the failures are recorded in the memory of control unit 13 at step 6. Additionally, turning on a warning light and/or emitting a buzzing sound to warn the driver of the failures may be executed. After step S6, the operation of diagnosing the gas-tightness terminates at step S7. If "NO" is determined through step S5, it means that the gas-tightness of fuel tank 1 is kept as indicated by the solid line shown in FIG. 4D. Accordingly, control unit 13 determines that each part functions normally. In this case, the operation of diagnosing the gas-tightness ends at step S7 without step S6.

In the shown embodiment, air pump 9 is mounted or provided in fuel tank 1, so that the layout space for air pump 9 can be easily allocated by applying space in fuel tank 1 and that number of and layout space needed for parts placed outside fuel tank 1 are decreased. Furthermore, air inlet 9A of air pump 9 is only necessary to be opened to an exterior space of fuel tank 1 through inlet pipe 11, while defining a protruded portion of inlet pipe 11 outwardly extending from an outer peripheral wall surface of fuel tank 1, and having as small a size (an axial length) as possible. Air outlet 9B of air pump 9 can be directly opened to an interior space of fuel tank 1. Thus, the structure of pipes of air pump 9 can be simplified, because it is not necessary to connect and place longer pipes. Accordingly, in designing a vehicle, layout of parts such as air pump 9 and inlet pipe 11 is efficiently designed by applying the space of fuel tank 1. The simplified structure makes assembly operation of a whole apparatus smooth. Additionally, placing or accommodating air pump 9 in fuel tank 1 contributes to increased layout space (installation flexibility) for other parts outside fuel tank 1, so that the limited space of the vehicle can be efficiently allocated.

Fuel tank 1 is made of a resin tank formed with blistered portion 1D, so that the shape of fuel tank 1 can be easily formed. The resin tank formed with blistered portion 1D in which pressurizing device (air pump 9) is mounted, is designed and constructed so that the blistered portion 1D is dimensioned to fill a dead space defined around the outer periphery of sealed fuel tank 1, while defining a larger volumetric capacity of sealed fuel tank 1. Blistered portion 1D can be shaped and placed filling remaining space (dead space) between other mounted parts (not shown) around fuel tank 1, so that volume of fuel tank 1 can be thus enlarged. Air pump 9 is mounted in blistered portion 1D, so that fuel tank 1 can be enlarged and the lay-out space for air pump 9 can be easily formed by applying a part of the blister portion 1D. Accordingly, the whole apparatus can be formed compact and easily mounted on the vehicle.

In the system of the embodiment, air pump 9 is mounted in blistered portion 1D formed in side wall 1B of fuel tank 1. The present invention is not limited only to the embodiment, but a pressurizing means may be also mounted in bottom panel 1A (or a blistered portion formed in bottom panel 1A) or upper panel 1C (or a blistered portion formed in upper panel 1C). Air pump 9 may be replaced by other pressurizing devices such as an air blower.

In the system of the embodiment, pressure sensor 12 is mounted in tank-side pipe 3. The present invention is not limited only to the embodiment, but a pressure sensor may be also mounted at any place where the pressure in fuel tank 1, tank-side pipe 3, canister 4, and engine-side pipe 5 can be sensed. For instance, as indicated by the one-dotted line in FIG. 1, the a pressure sensor 12' may be mounted in canister 4.

In the system of the embodiment, gas-tightness diagnosing includes a step of closing a purge control valve and an air induction valve to cut off a gas-tightness diagnosing space from an intake portion of an internal combustion engine. The present invention is not limited only to the embodiment, but the present invention may also cancel this step. In this case, the gas-tightness diagnosing may be based on a change in the internal pressure during a pressurizing step where an air pump is operated, because the internal pressure can be raised due to fluid resistance's generated by parts such as a canister, pipes and valves. For instance, if a sensed value of pressure remains lower than a threshold value during a predetermined time period from starting time of air pump, a control unit determines that there is a gas-tightness failure.

In the system of the embodiment, a gas-tightness diagnosing apparatus for a fuel tank with an evaporative emission purge system is applied to a vehicle such as an automobile. The present invention is not limited only to the embodiment, but the present invention can also be applied to various kinds of fuel tanks.

The entire contents of Japanese Patent Application No. 2002-362656 (filed Dec. 13, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A gas-tightness diagnosing apparatus comprising:

a fuel tank;

an evaporative emission purge system having a canister, for temporarily adsorbing fuel vapors created in the fuel tank by the canister and for purging the fuel vapors from the canister to an air intake portion of an internal combustion engine under a predetermined engine operating condition;

a pressurizing device that raises an internal pressure in the fuel tank and in the evaporative emission purge system;

a pressure sensor that detects the internal pressure;

a diagnosing device that diagnoses a gas-tightness of the fuel tank and of the evaporative emission purge system based on a change in the internal pressure; and the pressurizing device being mounted in the fuel tank, wherein:

the pressurizing device is mounted in a blistered portion of the fuel tank.

2. The gas-tightness diagnosing apparatus as claimed in claim 1, wherein:

the blistered portion, which accommodates therein the pressurizing device, is defined in either one of a side wall, an upper panel, and a bottom panel of the fuel tank.

3. A gas-tightness diagnosing apparatus comprising:

a fuel tank;

an evaporative emission purge system having a canister, for temporarily adsorbing fuel vapors created in the fuel tank by the canister and for purging the fuel vapors from the canister to an air intake portion of an internal combustion engine under a predetermined engine operating condition;

a pressurizing device that raises an internal pressure in the fuel tank and in the evaporative emission purge system;

a pressure sensor that detects the internal pressure;

a diagnosing device that diagnoses a gas-tightness of the fuel tank and of the evaporative emission purge system based on a change in the internal pressure; and the pressurizing device being mounted in the fuel tank, wherein:

the pressurizing device comprises:

(i) an inlet pipe; and (ii) an air pump mounted in the fuel tank and having an air outlet that is directly opened to an interior space of the fuel tank and an air inlet that is opened to an exterior space of the fuel tank through the inlet pipe, while defining a shorter axial length of a protruded portion of the inlet pipe, outwardly extending from an outer peripheral wall surface of the fuel tank.

4. A gas-tightness diagnosing apparatus comprising:

a fuel tank;

an evaporative emission purge system having a canister, for temporarily adsorbing fuel vapors created in the fuel tank by the canister and for purging the fuel vapors from the canister to an air intake portion of an internal combustion engine under a predetermined engine operating condition;

a pressurizing device that raises an internal pressure in the fuel tank and in the evaporative emission purge system;

a pressure sensor that detects the internal pressure;

a diagnosing device that diagnoses a gas-tightness of the fuel tank and of the evaporative emission purge system based on a change in the internal pressure; and the pressurizing device being mounted in the fuel tank, wherein:

the fuel tank is made of a resin tank formed with a blistered portion in which the pressurizing device is mounted, the blistered portion being dimensioned to fill a dead space defined around the fuel tank, while defining a larger volumetric capacity of the fuel tank.

5. A gas-tightness diagnosing apparatus comprising:

a fuel tank;

evaporative emission purge means for capturing fuel vapors created in the fuel tank, for temporarily storing the fuel vapors and for purging the fuel vapors to an air intake portion of an internal combustion engine under a predetermined engine operating condition;

pressurizing means for raising an internal pressure in the fuel tank and in the evaporative emission purge means;

pressure sensing means for detecting the internal pressure;

diagnostic means for diagnosing a gas-tightness of the fuel tank and of the evaporative emission purge means based on a change in the internal pressure; and pressurizing means being mounted in the fuel tank and mounted in a blistered portion of the fuel tank.

6. A gas-tightness diagnosing apparatus comprising:

a sealed fuel tank that stores therein volatile fuel;

an evaporative emission purge system having a canister, for temporarily adsorbing fuel vapors created in the sealed fuel tank by the canister and for purging the fuel vapors from the canister to an air intake portion of an internal combustion engine under a predetermined engine operating condition;

a pressurizing device that raises an internal pressure in the sealed fuel tank and in the evaporative emission purge system under a condition that the evaporative emission purge system is cut off from the air intake portion;

a pressure sensor that detects the internal pressure;

a diagnosing device that diagnoses a gas-tightness of the sealed fuel tank and of the evaporative emission purge system based on a change in the internal pressure; and the pressurizing device being mounted in the sealed fuel tank, wherein the pressurizing device is mounted in a blistered portion of the sealed fuel tank.

7. The gas-tightness diagnosing apparatus as claimed in claim 6, wherein:

the blistered portion, which accommodates therein the pressurizing device, is defined in either one of a side wall, an upper panel, and a bottom panel of the sealed fuel tank.

8. A gas-tightness diagnosing apparatus comprising:

a sealed fuel tank that stores therein volatile fuel;

an evaporative emission purge system having a canister, for temporarily adsorbing fuel vapors created in the sealed fuel tank by the canister and for purging the fuel vapors from the canister to an air intake portion of an internal combustion engine under a predetermined engine operating condition;

a pressurizing device that raises an internal pressure in the sealed fuel tank and in the evaporative emission purge system under a condition that the evaporative emission purge system is cut off from the air intake portion;

a pressure sensor that detects the internal pressure;

a diagnosing device that diagnoses a gas-tightness of the sealed fuel tank and of the evaporative emission purge system based on a change in the internal pressure; and the pressurizing device being mounted in the sealed fuel tank, wherein the pressurizing device comprises:

(i) an inlet pipe; and (ii) an air pump mounted in the sealed fuel tank and having an air outlet that is directly opened to an interior space of the sealed fuel tank and an air inlet that is opened to an exterior space of the sealed fuel tank through the inlet pipe, while defining a shorter axial length of a protruded portion of the inlet pipe, outwardly extending from an outer peripheral wall surface of the sealed fuel tank.

9. A gas-tightness diagnosing apparatus comprising:

a sealed fuel tank that stores therein volatile fuel;

an evaporative emission purge system having a canister, for temporarily adsorbing fuel vapors created in the sealed fuel tank by the canister and for purging the fuel vapors from the canister to an air intake portion of an internal combustion engine under a predetermined engine operating condition;

a pressurizing device that raises an internal pressure in the sealed fuel tank and in the evaporative emission purge system under a condition that the evaporative emission purge system is cut off from the air intake portion;

a pressure sensor that detects the internal pressure;

a diagnosing device that diagnoses a gas-tightness of the sealed fuel tank and of the evaporative emission purge system based on a change in the internal pressure; and the pressurizing device being mounted in the sealed fuel tank, wherein the sealed fuel tank is made of a resin tank formed with a blistered portion in which the pressurizing device is mounted, the blistered portion being dimensioned to fill a dead space defined around the sealed fuel tank, while defining a larger volumetric capacity of the sealed fuel tank.

10. A gas-tightness diagnosing apparatus comprising:

a sealed fuel tank that stores therein volatile fuel;

evaporative emission purge system having a canister, for temporarily adsorbing fuel vapors created in the sealed fuel tank by the canister and for purging the fuel vapors from the canister to an air intake portion of an internal combustion engine under a predetermined engine operating condition;

pressurizing means for raising an internal pressure in the sealed fuel tank and in the evaporative emission purge system under a condition that the evaporative emission purge system is cut off from the air intake portion;

pressure sensing means for detecting the internal pressure;

diagnostic means for diagnosing a gas-tightness of the sealed fuel tank and of the evaporative emission purge system based on a change in the internal pressure; and the pressurizing means being mounted in the sealed fuel tank and mounted in a blistered portion of the sealed fuel tank.

* * * * *